(12) United States Patent
Hopper et al.

(10) Patent No.: US 7,794,510 B1
(45) Date of Patent: Sep. 14, 2010

(54) ON CHIP BATTERY

(75) Inventors: Peter J. Hopper, San Jose, CA (US);
William French, San Jose, CA (US);
Robert Drury, Palo Alto, CA (US);
Vladislav Vashchenko, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 858 days.

(21) Appl. No.: 10/988,297

(22) Filed: Nov. 12, 2004

(51) Int. Cl.
*H01M 10/04* (2006.01)
*H01M 4/64* (2006.01)
*H01M 2/20* (2006.01)

(52) U.S. Cl. .................... 29/623.1; 429/122; 429/131; 429/162; 429/208

(58) Field of Classification Search .................. None
See application file for complete search history.

(56) References Cited

U.S. PATENT DOCUMENTS

| | | | | |
|---|---|---|---|---|
| 4,889,777 A | * | 12/1989 | Akuto | .................. 429/162 |
| 4,894,301 A | * | 1/1990 | Dyer | .................. 429/320 |
| 5,597,660 A | * | 1/1997 | Bates et al. | .................. 429/322 |
| 2003/0082446 A1 | * | 5/2003 | Chiang et al. | .................. 429/209 |
| 2004/0131897 A1 | * | 7/2004 | Jenson et al. | .................. 429/7 |
| 2006/0121342 A1 | * | 6/2006 | Sano et al. | .................. 429/162 |

OTHER PUBLICATIONS

Definition of "overlap" Merriam-Webster Online Dictionary: http://www.merriam-webster.com/dictionary.overlap. Accessed Jun. 19, 2009.*
Definition of "cover" Merriam-Webster Online Dictionary: http://www.merriam-webster.com/dictionary.cover. Accessed Jun. 19, 2009.*

* cited by examiner

*Primary Examiner*—Patrick Ryan
*Assistant Examiner*—Alix Echelmeyer
(74) *Attorney, Agent, or Firm*—Jurgen Vollrath; Vollrath & Associates

(57) ABSTRACT

In an on chip battery and method of making an on-chip battery, the electrodes are formed from metal layers deposited as part of the chip fabrication process. An electrolyte is preferably introduced between the electrodes at time of packaging of the chip.

12 Claims, 1 Drawing Sheet

ON CHIP BATTERY

FIELD OF THE INVENTION

The invention relates to integrated circuits.

BACKGROUND OF THE INVENTION

While integrated circuits are continually being reduced in size, some elements remain as stumbling blocks in the march toward smaller, lighter devices. Among these are the power supplies; in particular batteries. Batteries commonly constitute the heaviest and in many instances, the most space consuming part of a device. This is particularly so in miniature devices such as small, monolithic sensors.

One approach to addressing this problem is the development of passive devices such as RFID tags, which scavenge their energy from readers by making use of coils that are excited by RF fields emitted by the readers. However, situations present themselves where active devices are required with their own power supplies. WiFi tags, for example, are active sensors that can relay information to an access point without the need for readers to externally provide the power. The present invention seeks to address some of these issues.

SUMMARY OF THE INVENTION

According to the invention there is provided an on chip battery for an integrated circuit that includes at least two supply rails, the battery comprising two electrodes each connected to one of the supply rails, and an electrolytic compound between the electrodes for providing a path of ion exchange between the electrodes, wherein the electrodes are formed from metal layers deposited during chip fabrication.

Further, according to the invention, there is provided a method of forming an on chip battery comprising depositing at least two metal layers of different metals during chip fabrication, forming two electrodes from the two different metal layers, e.g., copper and nickel, and adding an electrolyte between the electrodes. The metal layers are typically formed as part of the backend process of the chip. The electrolyte may be provided at the time of packaging. The electrodes are typically horizontally spaced from each other and each may be formed to include one or more fingers. Preferably the electrolyte is chosen to have high ion conductivity without high speed corrosive properties. The electrolyte may be a liquid electrolyte or one that hardens into a solid. It may, for instance, be polymer based, porous silicon based, or comprise hydro fluoro carbons (HFCs) or NiH, LiH, or LiH with polymer.

DETAILED DESCRIPTION OF THE INVENTION

Figure 1:
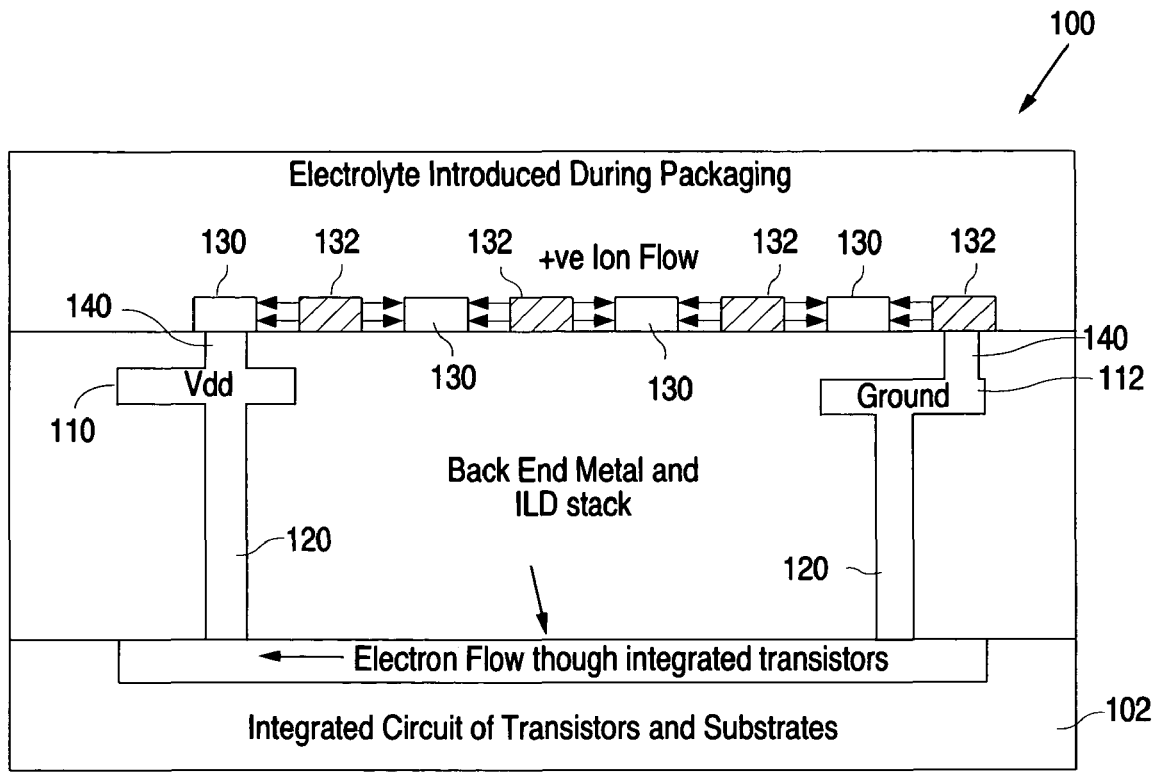
FIG. 1 is a sectional view through a typical on chip battery in accordance with the invention.

FIG. 1 shows one embodiment of the invention. The chip 100 includes an integrated circuit 102 of transistors and substrate. The integrated circuit 102 includes to power supply rails: Vdd and Vss or ground, which are connected to Vdd pad 110 and ground pad 112, respectively, by means of connecting vias 120. The pads 110, 112, and vias form part of the back end metal and ILD stack.

Figure 2:
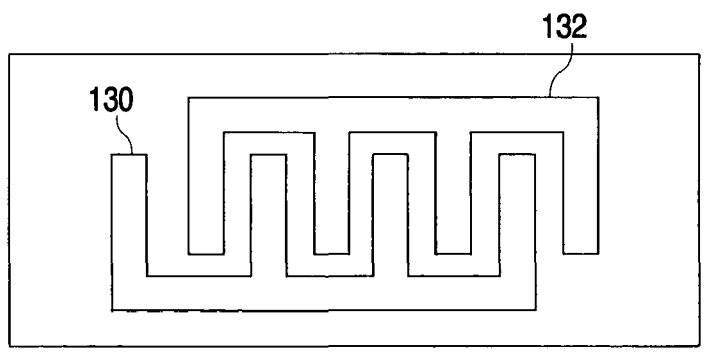
FIG. 2 is a plan view of the on chip battery of FIG. 1.

In accordance with the invention two metal electrodes 130, 132 are formed as part of the chip during the back end metal process. The electrodes 130, 132 are made of two different metals, e.g., metal and nickel or any other two metals or compounds that can exchange ions when an electrolyte is introduced between them. As shown in FIG. 1, and as seen more clearly in the plan view of FIG. 2, the two electrodes are formed with multiple fingers for enhanced ion exchange. In this embodiment, electrode 130 comprises a positive ion receptor while electrode 132 is a positive ion donor. The electrodes 130, 132 are electrically connected to the pads 110, 112 by means of vias 140.

In order to facilitate ion exchange between the electrodes 130, 132, an electrolyte is introduced into the gaps between the two electrodes. The electrolyte may be any electrolyte that provides for ion exchange and is preferably chosen to have high ion conductivity and without high speed corrosive properties. Any suitable electrolyte commonly used for large scale batteries can be used, and can for instance comprise a liquid or a liquid that hardens into a solid. Typical electrolytes include polymer based, porous silicon based, electrolytes that include hydro fluoro carbons (HFCs) or NiH, LiH, or LiH to name but a few. In this embodiment the electrolyte was introduced just before the circuit was packaged, which for convenience will be referred to herein as being at the time of packaging. This delays ion exchange between the metal plates for as long as possible.

It will be appreciated that the on chip battery of the present invention may supply all or only some of the power for the circuit. In some cases, instead of being the sole power source for the circuit, it may be used in conjunction with a conventional external power source to boost the power supply. For example, in a high frequency device, the additional power of an on chip battery may serve to extend the transmission range of the device.

While the invention was described with reference to a particular embodiment, it will be appreciated that different electrode configurations and materials could be adopted without departing from the scope of the invention.

What is claimed is:

1. An on-chip battery for an integrated circuit (IC), formed as part of an IC fabrication process, that includes at least two supply rails, the battery comprising two electrodes connected to two different supply rails, and an electrolytic compound between the electrodes for providing a path of ion exchange between the electrodes, wherein the electrodes are formed from metal layers deposited on a semiconductor surface as part of the IC fabrication process the electrodes defining walls extending upwardly from the semiconductor surface and laterally spaced from each other along the semiconductor surface, each wall defining at least one substantially vertical surface, electrolytic compound being retained only between the substantially vertical surfaces of adjacent electrode walls without extending over any horizontal surfaces of the walls.

2. A method of forming an on-chip battery comprising depositing at least two metal layers of different metals on a semiconductor surface during chip fabrication, forming two electrodes from the two different metal layers to define walls that are laterally spaced from each other along the semiconductor surface and extending upwardly from the semiconductor surface, each wall defining at least one substantially vertical surface, and thereafter adding an electrolyte between the substantially vertical surfaces of adjacent electrode walls to be retained only between the vertical surfaces and not any horizontal surfaces of the walls.

3. A method of claim 2, wherein the metal layers are formed as part of the backend process of the chip.

4. A method of claim 2, wherein the metal layers comprise copper and nickel metal layers.

5. A method of claim 2, wherein the electrolyte is added at the time of packaging.

6. A method of claim 5, wherein each electrode is formed to include one or more fingers.

7. A method of claim 2, wherein the electrode is chosen to have high ion conductivity without high speed corrosive properties.

8. A method of claim 5, wherein the electrode is chosen to have high ion conductivity without high speed corrosive properties.

9. A method of claim 2, wherein the electrolyte is a liquid electrolyte or one that hardens to a solid.

10. A method of claim 2, wherein the electrolyte is polymer based, porous silicon based, or comprises hydro fluoro carbons (HFCs) or NiH, LiH, or LiH with polymer.

11. A method of claim 5, wherein the electrolyte is a liquid electrolyte or one that hardens to a solid.

12. A method of claim 5, wherein the electrolyte is polymer based, porous silicon based, or comprises hydro fluoro carbons (HFCs) or NiH, LiH, or LiH with polymer.

* * * * *